United States Patent
Taylor et al.

(10) Patent No.: US 6,410,609 B1
(45) Date of Patent: Jun. 25, 2002

(54) LOW PRESSURE GENERATING POLYURETHANE FOAMS

(75) Inventors: Anthony James Taylor, Medina; Reto Faessler, Copley, both of OH (US)

(73) Assignee: Fomo Products, Inc., Norton, OH (US)

( * ) Notice: Subject to any disclaimer, the term of this patent is extended or adjusted under 35 U.S.C. 154(b) by 0 days.

(21) Appl. No.: 09/626,611

(22) Filed: Jul. 27, 2000

(51) Int. Cl.⁷ .................................................. C08J 9/04
(52) U.S. Cl. ....................... 521/131; 521/116; 521/130; 521/155; 521/170; 521/172; 521/174
(58) Field of Search ................................ 521/130, 131, 521/155, 116, 170, 172, 174

(56) References Cited

U.S. PATENT DOCUMENTS

| | | |
|---|---|---|
| 3,830,760 A | 8/1974 | Bengston |
| 4,115,300 A | 9/1978 | Chakirof |
| 4,130,614 A | 12/1978 | Saidla |
| 4,258,140 A | 3/1981 | Horacek et al. |
| 4,263,412 A | 4/1981 | Pauls |
| 4,558,073 A | 12/1985 | Kluth et al. |
| 4,751,253 A | 6/1988 | Tylenda |
| 4,929,646 A | 5/1990 | Nichols et al. |
| 5,001,165 A | 3/1991 | Canady et al. |
| 5,166,182 A | 11/1992 | Blanpied |
| 5,169,873 A | 12/1992 | Behme et al. |
| 5,478,494 A | 12/1995 | Lee et al. |
| 5,631,319 A | 5/1997 | Reese et al. |
| 5,668,378 A | 9/1997 | Treboux et al. |
| 5,677,361 A | 10/1997 | Treboux et al. |
| 5,684,057 A | 11/1997 | White, III et al. |
| 5,690,855 A | 11/1997 | Nichols et al. |
| 5,762,822 A * | 6/1998 | Tucker ........................ 521/131 |
| 5,773,483 A | 6/1998 | Eling et al. |
| 5,807,958 A | 9/1998 | Diblitz et al. |
| 5,922,779 A | 7/1999 | Hickey |
| 6,034,197 A | 3/2000 | Mahon et al. |
| 6,054,499 A | 4/2000 | Pauls et al. |

\* cited by examiner

*Primary Examiner*—John M. Cooney, Jr.
(74) *Attorney, Agent, or Firm*—Buckingham, Doolittle & Burroughs, LLP

(57) ABSTRACT

The invention described herein pertain generally to at least semi-rigid polyurethane foams which cure upon exposure to moisture and which contain major amounts of non-ozone depleting hydrofluorocarbon gas. The foams additionally contain a diisocyanate, preferably, 4,4'-diphenylmethane diusocyanate (MDI) and optionally including higher oligomers of MDI (polymeric MDI) in addition to at least two polyols of different molecular weights, e.g., as measured by number average molecular weight, preferably a polyester or polyether polyol, more preferably a polyalkylene polyol. The at least two polyols have a difference in molecular weight which is greater than or equal to 10%, preferably greater than or equal to 20%, more preferably greater than or equal to 35%, and most preferably greater than or equal to 50%, said number average molecular weight of the higher molecular weight polyol being no greater than approximately 4,000. Alternatively, a first of said at least two polyols having a number average molecular weight ranging from approximately 400 to 2000, and a second of said at least two polyols having a number average molecular weight ranging from approximately 800 to 4000 wherein a molecular weight of said second polyol is always greater than a molecular weight of said first polyol, and at least one catalyst.

56 Claims, 3 Drawing Sheets

Figure 1

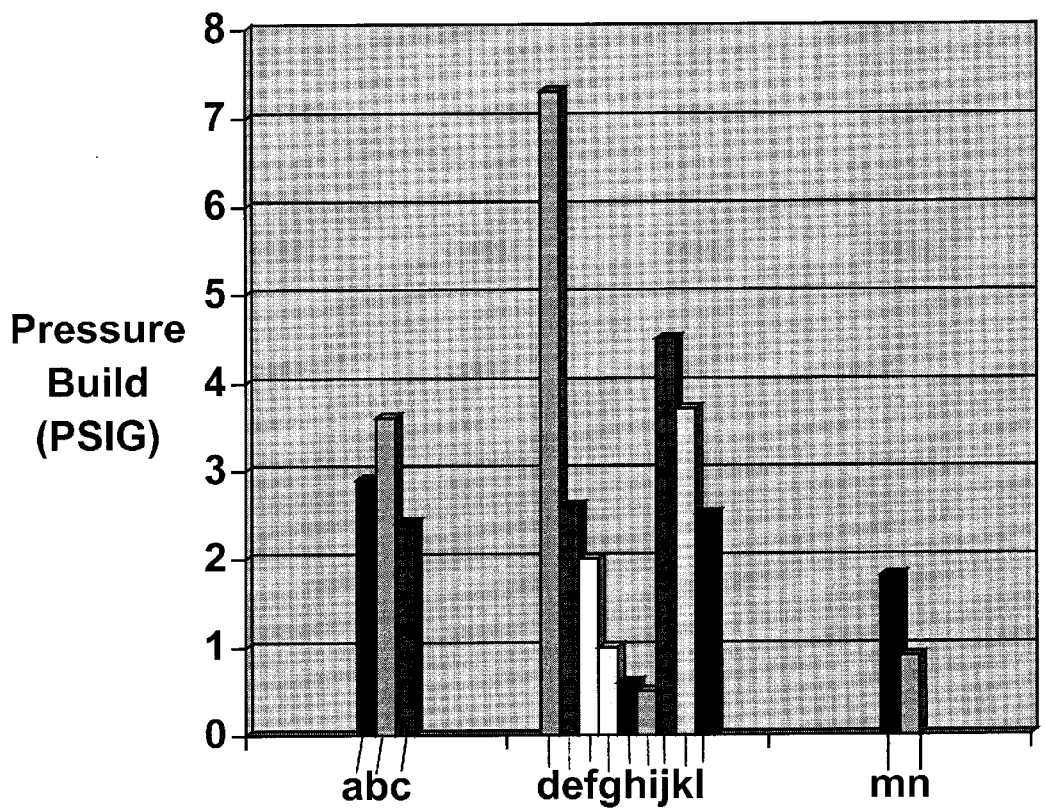

Polyurethane Foams

Straw | Gun | Cylinder

[a] Fomo Products – Mono Foam
[b] Dow – Great Stuff
[c] Convenience Products – Touch 'N Seal
[d] Fomo Products – 302 (w/BN)
[e] Fomo Products – 302 (w/o BN)
[f] Fomo Products – 303
[g] Fomo Products – Handi-Seal w/BN)

[h] Fomo Products – Handi-Seal (w/o BN)
[i] Hilti – CF 128 (w/BN)
[j] Private Label Product – Eco-Foam
[k] Convenience Products – Touch 'N Seal
[l] Dow – Enerform
[m] Fomo Products – 307 260 ME
[n] Fomo Products – Handi-Seal

LOW PRESSURE GENERATING POLYURETHANE FOAMS

TECHNICAL FIELD

The invention described herein pertains generally to a dimensionally stable, one-component at least semi-rigid, essentially closed cell, polyurethane foam, which cures upon reaction with moisture with relatively low expansion and concomitant low pressure build, in confined spaces.

BACKGROUND OF THE INVENTION

Polyurethanes in general are thermoplastic polymers, which can be made thermosetting, produced by the condensation reaction of a polyisocyanate and a hydroxyl-containing material, e.g., a polyol derived from propylene oxide. The basic polymer unit may be generically shown as follows.

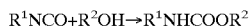

$$R^1NCO + R^2OH \rightarrow R^1NHCOOR^2$$

Polyurethanes have applications as fibers, coatings, elastomers, or foams. This invention relates to foams. Both flexible and rigid foams are available with density ranging from 0.5 to more than 60 pounds per cubic foot and thermal conductivities as low as 0.11 BTU in/ft$^3$ h ° F. Polyurethane foams are good insulators and can be derived from polyethers such as polypropylene glycol which is reacted with a diisocyanate in the presence of some water and a catalyst, e.g., amines, tin soaps, organic tin compounds. As the polymer forms, the water reacts with the isocyanate groups to cause crosslinking and chain extension, and also produces carbon dioxide which causes foaming. In some cases, a volatile material such as a blowing agent is added separately.

Polyurethane foams are produced by the reaction of a polyol, containing hydroxyl groups (OH), and a polyisocyanate having isocyanate groups (—N=C=O), in the presence of a catalyst, a blowing (or foaming agent) and optionally a surfactant and other ingredients. The polyol and polyisocyanate react exothermically (generating heat) to form the polymeric structure of the foam matrix. By varying the type and amount of reactants and optional additives, a wide variety of foams can be produced having densities ranging from less than one to over 60 lb/ft$^3$.

The polyol may be either a polyether or a polyester, with polyether polyols used most frequently. The polyisocyanates used most often in the production of rigid urethane foams are TDI (tolylene diisocyanate) and preferably, MDI (diphenylmethane diisocyanate). A polymeric form of MDI (crude MDI) is often used.

Polyurethane foams are usually prepared by the prepolymer process and preferably by the one-shot process. The reactants, prepolymers containing isocyanate groups or polyisocyanates, and polyols, together with blowing agents and catalysts, optionally with assistants and additives, are fed in metered amounts, separately or in the form of mixtures, to a mixing device, e.g., a mixing head, where they are thoroughly mixed and poured from dispensing devices, into molds or into cavities which are to be filled, and within which the mixture foams and cures.

It is also known to manufacture polyurethane foams from two-component systems, where component "A" preferably contains the organic polyol, the catalyst, blowing agents and additives and component "B" consists of polyisocyanates, with or without further assistants. The two components are separately stored in multi-compartment containers, preferably two-compartment containers. Before processing, the partition between the two compartments is destroyed and components "A" and "B" are mixed, after which the foamable mixture is processed.

It is additionally known that components "A" and "B" can be separately introduced into aerosol cans, stored, mixed by means of a suitable device and discharged from the can as a foamable mixture. A disadvantage of the process described is that it uses an expensive multi-compartment container with a mixing device, and that the entire contents of the can must be processed at once, since the mixture of components "A" and "B" cannot be stored.

U.S. Pat. No. 3,830,760 describes the manufacture of foamable polyurethane mixtures. Mixtures of the curable polymer or polymer intermediate and an inert blowing agent which is soluble in the polymer are accommodated in a container from which any desired amount of foam, within the limit of the capacity of the container, can be dispensed. Though the one-component foam allows convenient and advantageous processing, for example, it can be discharged from the aerosol can without weighing and mixing, this process also has certain disadvantages. For example the polyurethane mixture described in U.S. Pat. No. 3,830,760 has only a limited shelf life, the viscosity of the mixture rises relatively rapidly, and the contents can solidify on prolonged storage. It is a further disadvantage that the foamed polyurethane mixture reacts with the atmosphere, and cures, relatively slowly, so that the polyurethane foam may undergo post-expansion. This can lead to distortion of articles which have been filled with foam, for example, door frames or window frames.

U.S. Pat. No. 4,258,140 solves the post-expansion problem by releasing, and curing by interaction with the atmosphere, preferably with atmospheric moisture, a storage-stable mixture, which is under pressure, of prepolymers which contain isocyanate groups and are based on polyols and organic polyisocyanates, and blowing agents, with or without assistants and additives, wherein the polyols used are difunctional to octafunctional polyester-polyols and/or polyether-polyols which have an hydroxyl number of from 40 to 500 and contain chemically bonded tertiary amino groups in the polymer chain, or mixtures of such polyester-polyols and/or polyether-polyols, containing tertiary amino groups with nitrogen-free polyester-polyols and/or polyester-polyols. The foamable mixtures are expressly indicated to not contain any conventional low molecular weight monomeric polyurethane catalysts, for example, catalysts with molecular weights of less than 300, such as tertiary amines, salts of organic acids, organic tin compounds, and the like.

Commercially available one-component foams are not designed for the combination of low pressure build and dimensional integrity. Competitive one-component foams generally exhibit pressure builds within the range of 2 to 8 psig. One commercially available product manufactured by Hilti, and sold under the tradename CF 116 Filler Foam or CF 128 Insulating Foam, both products being single-component polyurethane based foams, the CF 128 product additionally being CFC-Free, does result in low pressure build up, but fails in dimensional stability as measured in direct comparison with the compositions of this invention.

It is an object of this invention to overcome the limitations of the prior art and to provide a one-component, at least semi-rigid, essentially closed cell polyurethane foam that cures upon exposure to atmospheric moisture, yet retains dimensional stability and results in low pressure build up within a cavity.

It is another object of this invention to provide a polyurethane foam that uses conventional catalysts.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 is a plot of pressure build (psig) for various polyurethane commercially available foam products shown in Table 1;

DETAILED DESCRIPTION OF THE INVENTION

Figure 2:
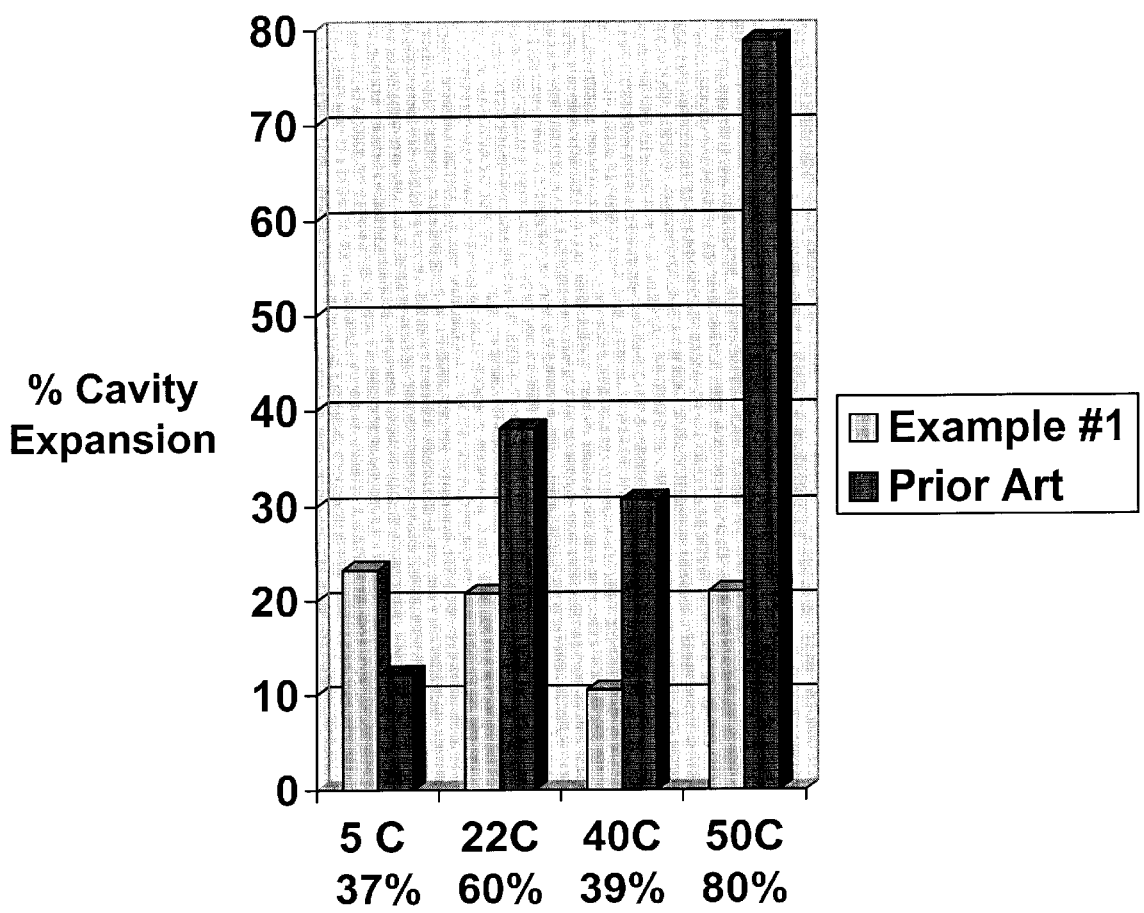
FIG. 2 is a plot of percentage of expansion in cavity of the product of this invention in comparison to a prior art polyurethane foam over a wide range of temperature and relative humidity conditions.

Referring now to the drawings wherein the showings are for purposes of illustrating the preferred embodiment of the invention only and not for purposes of limiting the same, the Figures when read in conjunction with the associated text, show that by following the teachings of the instant invention, an essentially closed cell, at least semi-rigid, one-component polyurethane foam with both low pressure build and dimensional stability is produced.

In one embodiment of this invention, a new polyurethane one-component foam is described and taught which is especially suitable for use with new constructions windows and doors, which as presently used in the building industry, are less sturdy than replacement windows, and thus, are susceptible to warpage and more particularly, bowing due to foam expansion. In this invention, the one-component foam, generates a very low degree of pressure on substrates when blown with a non-ozone depleting hydrofluorocarbon (HFC) gas, e.g., R-134a. The formulation is designed to absorb and dissipate the internal energy evolved during foam rise, thus limiting the amount of pressure exerted by the foam on contacted substrates. The pressure reduction can be as great as about 80% when compared to standard polyurethane foam products used in similar applications. This is critical in light of the fact that major window manufacturers, e.g., Pella and Andersen, place a warranty void sticker on windows built for new home construction, warning against the use of polyurethane foams in light of the association between window damage via pressure with prior art polyurethane foams.

This higher than acceptable pressure build is occurring in spite of the fact that many polyurethane manufacturers use hydrocarbon foaming agents, which are known to produce lower amounts of pressure, due to the inherent lower vapor pressure of hydrocarbons in comparison to HFC gas. Therefore, it is surprising that the invention has resulted in such a low pressure generation. This is all the more critical in hot, dry areas of the world, e.g., southwest region of the United States, where hydrocarbon blown foams are known to shrink as the hydrocarbons migrate out of the foam, resulting in foam shrinkage due to plasticization. The product of the present invention has good dimensional stability in all environments.

The invention comprises four essential components:
(1) a blowing agent, preferably a blowing agent for which a major amount is non-ozone depleting, and more preferably is completely non-ozone depleting, and most preferably is a hydrofluorocarbon gas, e.g., 1,1,1,2-tetrafluoroethane compressed gas (RFC 134a) [CAS Registry #811-97-2];
(2) a diisocyanate, preferably, 4,4'-diphenylmethane diisocyanate (MDI) [CAS Registry #101-68-8], optionally including higher oligomers of MDI (polymeric MDI) [CAS Registry #9016-87-9];
(3) at least two polyols of different molecular weights, e.g., as measured by number average molecular weight, $\overline{M}_n$, preferably a polyester or polyether polyol, more preferably a polyalkylene polyol, the at least two polyols having a difference in molecular weight which is greater than or equal to 10%, preferably greater than or equal to 20%, more preferably greater than or equal to 35%, and most preferably greater than or equal to 50%, said number average molecular weight of the higher molecular weight polyol being no greater than approximately 4,000. Phrased alternatively, yet not identically, a first of said at least two polyols having a number average molecular weight ranging from approximately 400 to 2000, and a second of said at least two polyols having a number average molecular weight ranging from approximately 800 to 4000 wherein a molecular weight of said second polyol is always greater than a molecular weight of said first polyol, more preferably the number average molecular weight of said first polyol ranges from approximately 600 to 1500, and the number average molecular weight of said second polyol ranges from approximately 1200 to 3000, most preferably the number average molecular weight of said first polyol ranges from approximately 800 to 1200, and the number average molecular weight of said second polyol ranges from approximately 1600 to 2400; and
(4) a least one catalyst.

Optionally, the invention will include a fifth component which includes surfactants, plasticizers, and other processing aids suitable for use in the production of rigid or semi-rigid foam. A non-limiting description of each category with illustrative examples, will include at least the following.

Polyol Compositions

As used in this application, the term "polyol(s)" includes polyols having hydroxyl, thiol, and/or amine functionalities. The term "polyol(s)" a used herein, however, is limited to compounds containing at least some polyester or polyoxyalkylene groups, and having a number average molecular weight of approximately 400 or more and less than or equal to approximately 4,000. Where the word "poly(s)" is used in conjunction with and to modify the words polyether, polyester, or polyalkylene polyether, the word "polyol" is then meant to define a polyhydroxyl functional moiety.

Polyalkylene polyether polyols may be generally prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. Included among the polyether polyols are polyoxyethylene polyols, polyoxypropylene polyols, polyoxybutylene polyols, polytetramethylene polyols, and block copolymers, for example combinations of polyoxypropylene and polyoxyethylene, poly-1,2-oxybutylene and polyoxyethylene polyols, poly-1,4-tetramethylene and polyoxyethylene polyols, and copolymer polyols prepared from blends or sequential addition of two or more alkylene oxides. The alkylene oxides may be added to the initiator individually, sequentially one after the other to form blocks, or in mixture to form a heteric polyether. The polyoxyalkylene polyether polyols may have either primary or secondary hydroxyl groups. For amine initiated polyols having either primary or secondary hydroxyl groups, it is preferred that at least one of the amine initiated polyols, are polyether polyols terminated with a secondary hydroxyl group through addition of, for example, propylene oxide as the terminal block.

Suitable initiator molecules are primary or secondary amines. These would include aromatic amines, such as aniline, N-alkylphenylene-diamines, 2,4'-, 2,2'-, and 4,4'-methylenedianiline, 2,6- or 2,4-toluenedianiine, vicinal toluenediamines, o-chloroaniline, p-aminoaniline, 1,5-diaminonaphthalene, methylene dianiline, the various condensation products of aniline and formaldehyde, and the isomeric diaminotoluenes. Aliphatic amines, branched or unbranched, substituted or unsubstituted, saturated or unsaturated, would include as examples, mono-, di-, and trialkanolamines, such as monoethanolamine, methylamine, triisopropanolamine; and polyamines such as ethylene diamine, propylene diamine, diethylenetriamine; or 1,3-diaminopropane, 1,3-diaminobutane and 1,4-diaminobutane.

Suitable polyester polyols include those derived from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, phthalic acid, hemimellitic acid, and 1,4-cyclohexanedicarboxlic acid. A suitable polyhydric alcohol may be used such as ethylene glycol, propylene glycol, dipropylene glycol, trimethylene glycol, propylene glycol, dipropylene glycol, trimethylene glycol, 1,2-butanediol, 1,4-pentanediol, 1,6-hexanediol, 1,7-heptanediol, hydroquinone, resorcinol, glycerol, glycerine, 1,1,1-trimethylolpropane, 1,1,1-trimethylolethane, pentaerythritol, 1,2,6-hexanetriol, $\alpha$-methylglucoside, sucrose, and sorbitol. Also included within the term "polyhydric alcohol" are compounds derived from phenol such as 2,2-bis(4-hydroxyphenyl)-propane, commonly known as Bisphenol A.

The hydroxyl-containing polyester can also be a polyester amide such as is obtained by including some amine or amino alcohol in the reactants for the preparation of the polyesters. Thus, polyester amides, may be obtained by condensing an amino alcohol such as ethanolamine with the polycarboxylic acids set forth above or they may be made using the same components that make up the hydroxyl-containing polyester with only a portion of the components being a diamine such as ethylene diamine.

Diisocyanate Compositions

Suitable organic polyisocyanates, defined as having 2 or more isocyanate functionalities, are conventional aliphatic, cycloaliphatic, araliphatic and aromatic isocyanates. Specific examples include: alkylene diisocyanates with 4–12 carbons in the alkylene radical such as 1,12-dodecane diisocyanate, 2-ethyltetramethylene 1,4-diisocyanate, 2-methylpentamethylene 1,5-diisocyanate, 2-methylpentamnethylene 1,5-diisocyanate, 2-ethyl-2-butylpentamethylene 1,5-diisocyanate, tetramethylene 1,4-diisocyanate; cycloaliphatic diisocyanates, such as cyclohexane 1,3- and 1,4-diisocyanate and any desired mixture of these isomers, 1-isocyanato-3,3,5-trimethyl-5-isocyanatomethylcyclohexane (isophorone diisocyanate), 2,4- and 2,6-hexahydrotolylene diisocyanate and the corresponding isomer mixtures, 4,4'-, and 2,4'- and 2,2'-dicyclomethane diisocyanate and the corresponding isomer mixtures, and preferably aromatic di- and polyisocyanates, for example, 2,4- and 2,6-tolylene diisocyanate and the corresponding isomer mixtures, 4,4'-, and 2,4'- and 2,2'-diphenylmethane diisocyanates and polyphenyl-polymethylene polyisocyanates (crude MDI) and mixtures of crude MDI and tolylene diisocyanates. The organic di- and polyisocyanates can be used individually or in the form of mixtures.

Blowing Agents

Various blowing agents are suitable for use in this invention. In a preferred embodiment, the blowing agent will be a non-ozone depleting blowing agent, either alone or in combination with other non-ozone depleting blowing agents. It is however, acceptable, although less preferred, to use a combination of blowing agents, at least a majority of which in a composition, are non-ozone depleting. The amount of blowing agent used is 18% by weight or more based on the weight of all raw materials used in the composition. The particular amount of blowing agent(s) will depend in part upon the desired density of the foam product. For most applications, polyurethane free rise densities for thermal insulation applications range from free rise densities of 0.5 to 4.0 pcf, preferably from 1.0 to 3.0 pcf.

Suitable perfluorinated hydrocarbons, hydrofluorocarbons (HFC's) and fluorinated ethers which are useful in accordance with the teachings of the present invention when present in a major amount, include difluoromethane (HFC-32); 1,1,1,2-tetrafluoroethane (HLFC-134a); 11,1,2,2-tetrafluoroethane (HFC-134); 1,1-difluoroethane (HFC-152a); 1,2-difluoroethane (HFC-142); trifluoromethane; heptafluoropropane; 1,1,1-trifluoroethane; 1,1,2-trifluoroethane; 1,1,1,2,2-pentafluoropropane; 1,1,1,3,3-pentafluoropropane (HFC-245fa); 1,1,1,3-tetrafluoropropane; 1,1,2,3,3-pentafluoropropane; 1,1,1,3,3-pentafluro-n-butane; 1,1,1,2,3,3,3-heptafluoropropane (HFC-227ea); hexafluorocyclopropane (C-216); octafluorocyclobutane (C-318); perfluorotetrahydrofuran; perfluoroalkyltetrahydrofurans; perfluorofuran; perfluoropropane; perfluorobutane; perfluorocyclobutane; perfluoropentane; perfluorocyclopentane; perfluorohexane; perfluorocyclohexane; perfluoroheptane; perfluorooctane; perfluorodiethyl ether; perfluorodipropyl ether; and perfluoroethylpropyl ether. Preferred among the HFC blowing agents is HFC-134a.

Suitable blowing agents, when present in a minor amount, include 1-chloro-1,2-difluoroethane; 1-chloro-2,2-difluoroethane (142a); 1-chloro-1,1-difluoroethane (142b); 1-chloro-1,1,2-trifluoroethane; 1-chloro-1,2,2-trifluoroethane; 1,1-dichloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and trans-chlorofluoroethylene (HCFC-1131), and various low boiling hydrocarbons such as propane, isopropane, butane and its isomers, pentane and its isomers, and hexane with its isomers.

The blowing agents which can be used in addition to the blowing agents listed previously would include chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included within the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids and tertiary alcohols.

Water is often used as a blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates. Water is typically found in minor quantities in the polyols as a byproduct and may be sufficient to provide the desired blowing from a chemically active substance. Preferably, however, water is additionally introduced into the polyol composition in amounts from 0.02 to 5 weight percent, preferably from 0.5 to 3 weight percent, based on the weight of the polyol composition.

The organic carboxylic acids used are advantageously aliphatic mono-and polycarboxylic acids, e.g., dicarboxylic acids. However, other mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine, and/or chlorine, and alkyl, e.g., methyl or ethyl. The substituted organic carboxylic acids expediently contain at least one further group which is reactive toward isocyanates, e.g., a mercapto group, a primary and/or secondary amino group, or preferably a primary and/or secondary hydroxyl group.

Suitable carboxylic acids are thus substituted or unsubstituted monocarboxylic acids, e.g., formic acid, acetic acid, propionic acid, 2-chloropropionic acid, 3-chloropropionic acid, 2,2-dichloropropionic acid, hexanoic acid, 2-ethyihexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, and ricinoleic acid, 2-aminopropionic acid, benzoic acid, 4-methylbenzoic acid, salicylic acid, and anthranilic acid, and unsubstituted or substituted polycarboxylic acids, preferably dicarboyxlic acids, e.g., oxalic acid, malonic acid, succinic acid, fiunaric acid, maleic acid, glutaric acid, adipic acid, sebacic acid, dodecanedoic acid, tartaric acid, phthalic acid, isophthalic acid and citric acid.

The amine salts are usually formed using tertiary amines, e.g., triethylamine, dimethylbenzylamine, diethylbenzylamine, triethylene diamine, or hydrozine. Tertiary amine salts of formic acid may be employed as chemically active blowing agents which will react with the organic isocyanate. The salts may be added as such or formed in-situ by reaction between any tertiary amine (catalyst or polyol) and formic acid contained in the polyol composition.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents are the volatile non-halogenated hydrocarbons having two to seven carbon atoms such as alkanes, alkenes, cycloalkanes having up to 6 carbon atoms, dialkyl ethers, cycloalkylene ethers and ketones; and decomposition products.

Examples of volatile non-halogenated hydrocarbons include linear or branched alkanes, e.g., butane, isobutane, 2,3-dimethylbutane, n-pentane, isopentane and technical-grade pentane mixtures, n-hexane and isohexane, n-heptane and isoheptane, n-undecane and isoundecane, and n-dodecane and isododecane. N-pentane, isopentane or n-hexane or a mixture thereof can be employed as additional blowing agents. Furthermore, specific examples of alkenes are 1-pentene, 2-methylbutene, 3-methylbutene, and 1-hexene, or cycloalkanes in addition to cyclopentane are cyclobutane and cyclohexane, specific examples of linear or cyclic ether are dimethyl ether, diethyl either, methyl ethyl ether, vinyl methyl ether, vinyl ethyl ether, divinyl ether, tetrahydrofuran and furan, and specific examples of ketones are acetone, methyl ethyl ketone and cyclopentanone. Pure or technical grade cyclopentane may be used, the latter containing about 70 weight percent cyclopentane with the remainder including 2,3-dimethylbutane, pentane, and isopentane. Mixtures of cyclopentane, pentane, and isopentane are also included. It is known that flammable propellants exert various vapor pressures and can be formulated and blended via Dalton's law to exert a given pressure. Commonly used hydrocarbon propellants can exert vapor pressures from 14 to 103 psig. Typically, they have higher Kauri-Butanol values than hydrofluorocarbons and hydrofluorocarbons. This denotes greater solubility in the resin system.

Decomposition type physically active blowing agents which release a gas through thermal decomposition include pecan flour, amine/carbon dioxide complexes, and alkyl alkanoate compounds, especially methyl and ethyl formates.

Catalysts

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by the tin as the metal, are represented by the formula: $R_nSn[X—R^1—Y]_2$, wherein R is a $C_{1-8}$ alkyl or aryl group, $R^1$ is a $C_{0-18}$ methylene group, optionally substituted or branched with a $C_{1-4}$ alkyl group, Y is hydrogen or an hydroxyl group, preferably hydrogen, X is methylene, an —S—, an —$SR^2CO$, —SOOC—, an —$O_3S$—, or an —OOC— group wherein $R^2$ is a $C_{1-4}$ alkyl, n is 0 or 2, provided that $R^1$ is $C_0$ only when X is a methylene group. Specific examples are tin(II) acetate, tin(II) octanoate, tin(II) ethylhexanoate and tin(II) laurate; and dialkyl ($C_{1-8}$) tin(IV) salts or organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl ($C_{1-8}$) tin(IV) salts of inorganic compounds such as butyltin trichloride, dimethyl-, diethyl-, dibutyl-, dioctyl-, and diphenyl- tin oxide, di(2-ethylhexyl)tin oxide, dibutyltin dichloride, and dioctyltin dioxide. Preferred, however, are tin catalysts with tin-sulfur bonds which are resistant to hydrolysis, such as dialkyl ($C_{1-20}$) tin dimercaptides, including dimethyl-, dibutyl-, and dioctyl-tin dimercaptides.

Tertiary amines also promote urethane linkage formation. These amines would include aliphatic tertiary amines, N-substituted morpholines or N,N'-substituted piperzaines. Examples of the same include triethylamine, 3-methoxypropyldimethylamine, triethylenediamine, tributylamine, dimethylbenzylamine, N-methyl, N-ethyl-, and N-cyclohexylmorpholine, N,N-dimorpholineodiethylether, N,N,N',N'-tetramethylenediamine, N,N,N',N'-tetramethylbutanediamine or -hexanediamine, N,N,N'-trimethyl isopropyl propylenediamine, pentamethyldiethylenetriamine, tetramethyldiarinoethyl ether, bis(dimethylaminopropyl) urea, dimethylpiperzaine, 1-methyl-4-dimethylaminoethypiperzaine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine.

Additives

Additives may or may not be incorporated into the storage-stable, foamable mixture. Examples are surfactants, plasticizers, flameproofing agents, pore regulators, UV absorbers, dyes, softeners, viscosity regulators, rheology controlling additives and anti-hydrolysis agents. Many of the optional additives which are listed below, can function in dual capacities, and the listing of any one additive within a singular category is for illustrative purposes only, and is not meant to be limiting of the function served therein.

Surfactants

Without being held to any one theory of operation, or mechanism of operation, surfactants may assist with the homogenization of the starting materials and may also serve to regulate the cell structure of the foams. Specific examples are siloxane-oxyalkylene copolymers and other organopolysiloxanes, oxyethylated alkylphenols, oxyethylated fatty alcohols, paraffin oils, castor oil esters, ricinoleic acid esters and turkey red oil, these being employed in amounts of from 0 to 15% by weight on the polyol side of the composition.

Plasticizers

It can be advantageous to incorporate at least one plasticizer into the reaction mixture so that the tendency of the products to brittleness is reduced. Conventional plasticizers can be used, but it is particularly advantageous to employ those which contain phosphorus atoms and/or halogen atoms, and hence additionally increase the flame repellency of the polyurethane. A non-limiting, non-exhaustive exemplary list of plasticizers would include tricresyl phosphate, tris-2-chloroethyl phosphate, tris-o-chloropropyl phosphate and tris-2,3-dibromopropyl phosphate. In addition to the above, chloroparaffins, halophosphites, ammonium phosphate, and halogen-containing and phosphorus-containing resins may be used. Plasticizers can be added, either singly or in combination, in amounts ranging from 0 to 35% by weight on the polyol side.

Pore Regulators or Cell Openiers

Cell opening additives can be used either alone or in combination with free acids. In general, one class of additives will comprise: (a) a long chain hydrocarbon free acid; (b) a polyol long chain acid ester product; or (c) a combination of the free acid and the ester product. The free acid is generally added to the polyol side of the urethane composition and should be compatible with and soluble in the polyol composition employed. Generally, the free acid comprises an alkanoic acid or alkenoic acid, such as a $C_{14-22}$ saturated or unsaturated faty acid, or mixtures thereof. A $C_{18}$ fatty acid is often used, such as, but not limited to: oleic acid, stearic acid, sterolic acid, linolenic acid, linoleic acid and combinations thereof.

The amount of free acid may vary depending upon the specific foamable composition used. The range of concentration for each particularly foamable composition can be easily determined by testing the foamable composition with a varying concentration of the free acid and testing the resulting foam product for the variation in open cells, such as by the use of established air flow testing techniques and apparatus. The polyol-acid ester product is typically a glycol long chain acid ester product, and often, a polyethylene or polypropylene glycol product which has been reacted, fully or partially, with the free acid, for example, a fatty acid like oleic or linoleic acid, or mixtures, to provide for a polyethylene glycol or polypropylene glycol oleate or linoleate product.

Another type of cell opener comprises a random copolymer of ethylene oxide and propylene oxide of defined molecular weight ranging from 1,500 to 35,000. Still yet another cell opener is a 1% emulsion in castor oil of a composition of 80% liquid polybutadiene with a molecular weight of about 3000 and a viscosity at 20° C. of 3000 mnPa.s and 20% surface active agent as an emulsifier (weight ratio) available from Goldschmidt under the designation TEGO IMR 830 with a hydroxyl number of 160, the temperature being carefully controlled. Suitable polybutadienes are liquid products offered by Hulls AG with a viscosity of at least 500 mPa.s at 20° C. The viscosity is preferably at least 2000 mPa.s at 20° C. and in particular about 3000 mPa.s at 20° C. An especially suitable liquid polybutadiene is sold under the designation Polyol 130 with about 75% 1,4-cis double bonds, about 24% 1,4-trans double bonds and about 1% vinyl double bonds and a molecular weight (vapor pressure osmotic) of about 3000. The content of liquid polybutadiene is 0 to 2 weight percent. Suitable polybutadienes further include those products of higher molecular weight which can be added to the prepolymer composition in a dissolved form or be dissolved therein. Also, higher molecular weight polymeric hydrocarbons containing double bonds can be used. The molecular weight of such ranging from 1,000 to 9,000, in particular, up to 5,000. In addition to the pure (liquid) polybutadiene, it is also possible to incorporate copolymers of 1,3-butadiene with other 1,3-dienes, for example isoprene, 2,3-dimethylbutadiene, piperylene, and with vinylaromatic compounds such as styrene, -methylstyrene, vinyl toluene and divinylbenzene. The content of such comonomers in the copolymers should not exceed 50%. Such copolymers are regarded as falling within the designation of (liquid) polybutadiene if they are liquid or soluble.

Processing

The storage-stable, foamable mixture of prepolymers containing isocyanate groups and of blowing agents, with or without assistants and additives, may for example, be prepared in bulk in pressure kettles and then be packaged in suitable containers of various sizes, for example aerosol cans of from 0.25 to 5 liters capacity or pressure vessels of from 50 to 100 liters capacity, such as those conventionally employed for industrial purposes. However, it is also possible to prepare the prepolymer containing isocyanate groups, from polyisocyanates and the nitrogen-containing polyols or the polyol mixture directly in the appropriate pressure vessels in the presence of the blowing agent, or to introduce the blowing agent subsequently into the pressure vessel.

To prepare the dimensionally stable polyurethane foam, the storage-stable mixture, which is under pressure, of the prepolymers containing isocyanate groups, and of blowing agents, with or without assistants and additives, is brought to atmospheric pressure by means of a suitable device, for example a valve. On releasing the pressure, the mixture foams up and cures rapidly by reaction with the atmosphere, in particular by reaction with the water vapor contained in the latter.

EXAMPLE #1

A liquid urethane prepolymer mixture was packaged under pressure of a non-flammable compressed gas, comprising: 1,1,1,2-tetrafluoroethane compressed gas (HFC 134a), CAS #811-97-2; 4,4'-diphenylmethane diisocyanate (MDI), CAS #101-68-8; higher oligomers of MDI (polymeric MDI), CAS #9016-87-9; and a polyurethane prepolymer of MDI, 2,2;2,4-Diphenylmethane Diisocyanate (CAS #26447-40-5) were combined in the ratios listed below.

EXAMPLE #2

A polyurethane foam of the following composition is within the scope of this invention as evidenced by the table below.

| Component | Wt. % | % Total | 24 oz. Can (g) |
|---|---|---|---|
| B-Side | | | |
| Polyol A (hydroxyl #56) 1,2-propylene glycol-propylene oxide polymer | 66.0 | | 164.34 |
| Plasticizer/Flame Retardants | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals | 100.0 | 36.6 | 249.0 |
| A-Side | | | |
| MDI | 100.0 | 45.4 | 308.5 |
| Propellant | | | |
| R-134a | 100.0 | 18.0 | 122.5 |
| Totals | | 100.0 | 680.0 |

EXAMPLE #3

A polyurethane foam of the following composition is within the scope of this invention as evidenced by the table below.

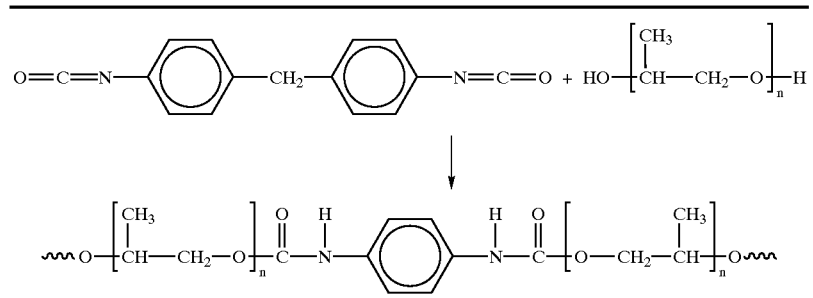

| Component | Wt. % | % Total | 24 oz. Can (g) |
|---|---|---|---|
| B-side | | | |
| Polyol A (hydroxyl #56) 1,2-propylene glycol-propylene oxide polymer | 33.0 | | 82.17 |
| Polyol B (hydroxyl # 112) Block polyoxyethylene-polyoxypropylene | 33.0 | | 82.17 |
| Plasticizer/Flame Retardants | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals | 100.0 | 36.6 | 249.0 |
| A-Side | | | |
| MDI | 100.0 | 45.4 | 308.5 |
| Propellant | | | |
| R-134a | 100.0 | 18.0 | 122.5 |
| Totals | | 100.0 | 680.0 |

| Component | Wt. % | % Total | 24 oz. Can (g) |
|---|---|---|---|
| B-Side | | | |
| Polyol B (hydroxyl #112) Block polyoxyethylene-polyoxypropylene | 66.0 | | 164.34 |
| Plasticizer/Flame Retardants | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals A-Side | 100.0 | 36.6 | 249.0 |
| MDI Propellant | 100.0 | 45.4 | 308.5 |
| R-134a | 100.0 | 18.0 | 122.5 |
| Totals | | 100.0 | 680.0 |

EXAMPLE #4

A polyurethane foam of the following composition is within the scope of this invention as evidenced by the table below.

| Component | Wt. % | % Total | 24 oz. Can (g) |
|---|---|---|---|
| B-Side | | | |
| Polyol A (hydroxyl #56) 1,2-propylene glycol-propylene oxide polymer | 33.0 | | 82.17 |
| Polyol B (hydroxyl #112) Block polyoxyethylene-polyoxypropylene | 33.0 | | 82.17 |
| Paroil-45 (chlorinated paraffin) | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals A-Side | 100.0 | 36.6 | 249.0 |
| MDI Propellant | 100.0 | 45.4 | 308.5 |
| R-134a | 100.0 | 18.0 | 122.5 |
| Totals | | 100.0 | 680.0 |

EXAMPLE #5

A polyurethane foam of the following composition is within the scope of this invention as evidenced by the table below.

| Component | Wt. % | % Total | 24 oz. Can (g) |
|---|---|---|---|
| B-Side | | | |
| Polyol A (hydroxyl #56) 1,2-propylene glycol-propylene oxide polymer | 33.0 | | 82.17 |
| Polyol B (hydroxyl #112) Block polyoxyethylene-polyoxypropylene | 33.0 | | 82.17 |
| Tris(monochloropropyl) phosphate | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals A-Side | 100.0 | 36.6 | 249.0 |
| MDI Propellant | 100.0 | 45.4 | 308.5 |
| R-134a | 100.0 | 18.0 | 122.5 |
| Totals | | 100.0 | 680.0 |

EXAMPLE #6

A polyurethane foam of the following composition is within the scope of this invention as evidenced by the table below.

| Component | Wt. % | % Total | 24 oz. Can (g) |
|---|---|---|---|
| B-Side | | | |
| Polyol A (hydroxyl #56) 1,2-propylene glycol-propylene oxide polymer | 33.0 | | 82.17 |
| Polyol B (hydroxyl #112) Block polyoxyethylene-polyoxypropylene | 33.0 | | 82.17 |
| Plasticizers | 27.5 | | 68.48 |
| Surfactant | 3.0 | | 7.47 |
| Catalyst | 3.0 | | 7.47 |
| Cell Opener | 0.3 | | 0.75 |
| Dye | 0.2 | | 0.50 |
| Sub-Totals A-Side | 100.0 | 36.6 | 249.0 |
| MDI Propellant | 100.0 | 45.4 | 308.5 |
| R-22 | 100.0 | 18.0 | 122.5 |
| Totals | | 100.0 | 680.0 |

FIG. 1 shows the pressure build of various commercially available polyurethane foam products to that of Example #1, one composition of the instant invention sold commercially under the tradename HANDI-SEAL. The following products were tested for pressure build using a pressure transducer to measure the amount of pressure exerted on a substrate. The results of head-to-head comparisons of the products are summarized in Table 1, and shown graphically in FIG. 1.

TABLE 1

| Straw Foams | | Gun Foams | | Cylinder Foams | |
|---|---|---|---|---|---|
| Product | Psig | Product | psig | Product | psig |
| Fomo Products Mono-Foam[8] | 2.9 | Fomo Products 302[4] (w/ BN[a]) | 7.3 | Fomo Products 307 260 ME[6] | 1.8 |
| Dow Great Stuff[2] | 3.6 | Fomo Products 302[4] (w/o BN[b]) | 2.6 | Fomo Products Handi-Seal[7] | 0.9 |
| Convenience Products Touch 'N Seal[3] | 2.4 | Fomo Products 303[5] | 2.0 | | |
| | | Fomo Products Handi-Seal[7] (w/ BN) | 1.0 | | |
| | | Fomo Products Handi-Seal[7] (w/o BN) | 0.6 | | |
| | | Hilti CF 128[9] (w/ BN) | 0.5 | | |
| | | Private label product Eco-Foam[10] | 4.5 | | |
| | | Convenience Products Touch 'N Seal[3] | 3.7 | | |
| | | Dow Enerfoam[1] | 2.5 | | |

[a]w/ BN = with Brass Nozzle
[b]w/o BN = without Brass Nozzle

[1]Dow     Enerfoam     30–60% 4,4'-diphenylmethane-diisocyanate (MDI)
                                       30–60% Polymeric MDI
                                       15–40% Polyether Polymeric Blend
                                       15–40% Chlorodifluoromethane (HCFC-22)

[2]Dow     Great Stuff     10–30% 4,4'-diphenylmethane-diisocyanate (MDI)
                                       10–30% Polymeric MDI
                                       15–40% Polyether Polymeric Blend
                                       10–30% Liquified Petroleum Gas

[3]Convenience     Touch 'N Seal     MDI Monomer
                                       Polyurethane Resin
                                       Chlorodifluoromethane (HCFC-22)

[4]Fomo Products     302     10–30% Fluorocarbon (HCFC)
                                       7–13% 4,4'-diphenylmethane-diisocyanate (MDI)
                                       7–13% Polymeric MDI

[5]Fomo Products     303     10–30% Liquified Petroleum Gas
                                       7–13% 4,4'-diphenylmethane-diisocyanate (MDI)
                                       7–13% Polymeric MDI

[6]Fomo Products     307     10–30% Fluorocarbon (HCFC)
                                       7–13% 4,4'-diphenylmethane-diisocyanate (MDI)
                                       7–13% Polymeric MDI

[7]Fomo Products     Handi-Seal     7–13% 4,4'-diphenylmethane-diisocyanate (MDI)
                                       7–13% Polymeric MDI
                                       40–70% Polyether Polymeric Blend
                                       10–30% 1,1,1,2-tetrafluoroethane (HFC-134a)

[8]Fomo Products     Mono-Foam     10–30% Fluorocarbon
                                       7–13% 4,4'-diphenylmethane-diisocyanate (MDI)
                                       7–13% Polymeric MDI

[9]Hilti     CF 128     Urethane prepolymer containing 4,4'-diphenylmethane-diisocyanate (MDI)
                                       Dimethyl ether
                                       1,1,1,2-tetrafluoroethane
                                       Propane
                                       Butane

[10]Private label     Eco-Foam     Composition unknown

As is evident from both FIG. 1 and Table 1, the amount of pressure build due to post expansion, is minimal for the product of the instant invention, less than or equal to 2 psig, preferably less than or equal to 1.5 psig, and more preferably less than or equal to 1.2 psig, and most preferably, less than or equal to 1 psig.

However, low pressure build is only part of the issue, the second component being dimensional stability. A direct comparison between the product of this invention and that of Hilti was made regarding dimensional stability. The following test protocol was used. Foams were fully cured at standard conditions of 21° C., 50% relative humidity (RH). Two 4"×4"×2" samples were cut from the core of the foam sample (if the sample is from a caulking bead dispensed from a Straw or one-component gun, a ½"×½"×4" specimen is cut from the bead core) for each of the test conditions. Marks are made at the midpoint on each of the four sides of one face (4"×4" or ½"×4" face) and indications as to which is the width and length of the face. One side is marked and indicated to be the thickness. Each dimension is subsequently measured and recorded in Table II. Two specimens of each are placed into the test chamber and measured.

TABLE II

| | | | RH | Width (mm) | | | |
|---|---|---|---|---|---|---|---|
| | | T (° C.) | (%) | Initial | +1 day | +2 days | +7 days |
| Hilti | Side #1 | 50 | 20 | 21.3 | 17.6 | 18.2 | 21.1 |
| | Side #2 | 50 | 20 | 22.1 | 17.2 | 17.6 | 20.1 |

TABLE II-continued

| | | RH | Width (mm) | | | |
|---|---|---|---|---|---|---|
| | T (° C.) | (%) | Initial | +1 day | +2 days | +7 days |
| Example #1 Side #1 | 50 | 20 | 20.5 | 20.6 | 20.4 | 20.7 |
| Side #2 | 50 | 20 | 20.5 | 20.7 | 20.7 | 21.1 |

As is evident from the Table above, the expansion of the foam of the invention (Example #1) remained essentially constant over time, whereas the initial width of that of Hilti decreased by approximately 17–22%. This is a large problem in the insulation industry, where the initial contraction of the foam will cause a gap between the frame of the window and the outline frame of the window, thereby leading to drafts, the very aspect that the foam insulation was designed to prevent.

The robustness of the product was tested over a wide range of conditions, i.e., temperature and relative humidity. A percentage of expansion in a cavity of various products was conducted in the following manner. An open-faced, open ended, rectangular box of dimensions 15⅞"×1¹¹⁄₁₆"×3¹³⁄₁₆" is constructed using two strips of plywood (3¹³⁄₁₆"×15⅞"×⅜₁₆") which are attached by tape to a horizontal (flat) piece of cardboard. A predetermined amount of foam is dispensed into the cavity between the plywood strips and allowed to expand. The pressure build of the system is indirectly measured by the increase in the cavity's width. An initial width measurement (Wi) is taken 7¹¹⁄₁₆" from the bottom and is the width measurement of the open face. This area is marked with an indelible marker. The final measurement is taken 16–24 hours later, at complete foam cure, at the exact same place that the initial measurement was taken, and is denoted as (We) width after cure. The percentage expansion in cavity is calculated using the formula ((We−Wi)/Wi)×100=% expansion in cavity. The results of the test are summarized in Table III and shown graphically in FIG. 2.

TABLE III

| Conditions | | Example #1 (invention) | 1K Foam (prior art) |
|---|---|---|---|
| T (° C.) | RH (%) | % Expansion | % Expansion |
| 5 | 37 | 23.3 | 12.2 |
| 22 | 60 | 20.8 | 38.1 |
| 40 | 39 | 10.5 | 30.7 |
| 50 | 80 | 21.0 | 78.9 |

As seen in the table, regardless of the temperatures or relative humidity, the performance of the polyrethane foam of the instant invention is much more robust, i.e., the absolute percentage of expansion difference (delta between highest and lowest expansion) for Handi-Seal being 12.8%, in comparison to the prior art value of 66.7%.

Figure 3:
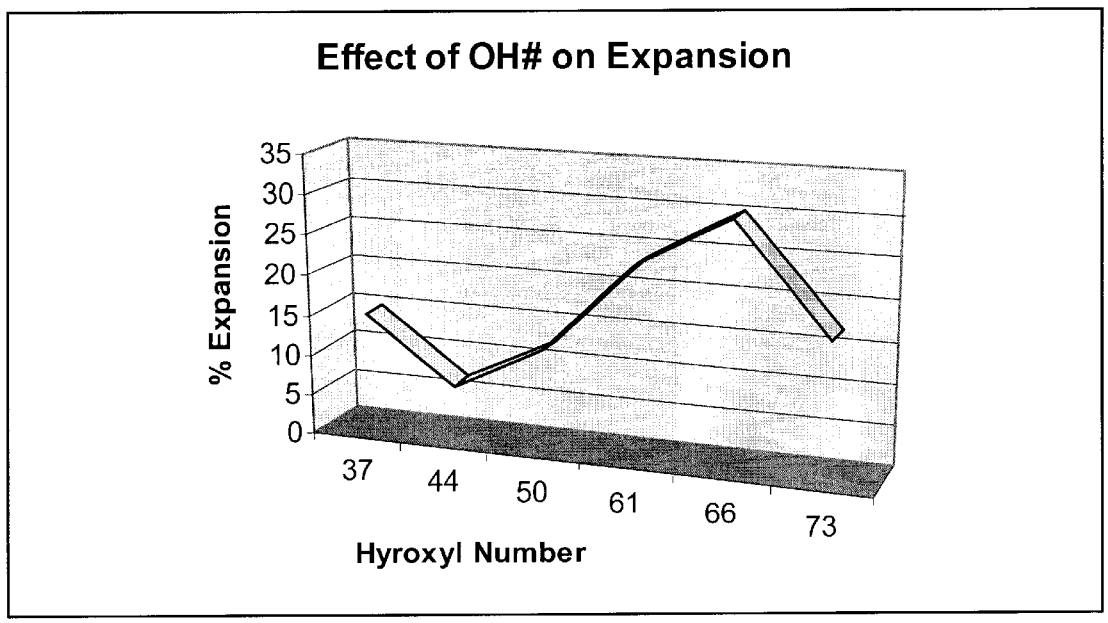
FIG. 3 is a plot of the effect of hydroxyl number and packing on the percentage of expansion in cavity.

The relationship between hydroxyl number and percentage expansion in cavity is shown in FIG. 3, as in Table IV.

TABLE IV

| OH # | % Expansion (in cavity) | 1000 $\overline{M}_n$ polyol (moles) | 2000 $\overline{M}_n$ polyol (moles) | Ratio |
|---|---|---|---|---|
| 36.96 | 14.7 | 0 | 0.1749 | 0:1 |
| 44.11 | 6.9 | 0.0698 | 0.1405 | 1:2 |
| 49.61 | 12.4 | 0.1219 | 0.114 | 1.06:1 |
| 60.61 | 23.7 | 0.2279 | 0.061 | 3.74:1 |
| 66.11 | 30.1 | 0.2809 | 0.0345 | 8.14:1 |
| 73.26 | 16.9 | 0.3498 | 0 | 1:0 |

At least one of the keys to the invention of using different molecular weight polyols centered around the thought that by using a blended composition of diols, it would be possible to provide a lower crosslink density than possible with triols and tetrols etc., to provide both strength (lower $\overline{M}_n$ diol, critical for dimensional stability) and energy dissipation (higher $\overline{M}_n$, more flexible—vibrate to dissipate energy). This study on polyol ratio was done to find a minimum in the curve for expansion in cavity (lowest pressure). The breadth of hydroxyl numbers covers what is believed to be the useful range for a 1K (one-component) sealant foam.

Discussion

Without being held to one theory of operation, or one mode of performance, it is believed that the benefits of the invention are derived at least in part, due to a combination of the use of polyols of defined molecular weight ranges and ratios and blowing agents used, preferably only non-ozone depleting, although a minor percentage of hydrocarbons can be incorporated into the blowing agent if desired. In a most preferred embodiment, the polyols are propylene oxide based, and in a ratio of approximately 1:2. The molecular weight, $\overline{M}_n$, of the polyols will have a difference in molecular weight which is greater than or equal to 10%, preferably greater than or equal to 20%, more preferably greater than or equal to 35%, and most preferably greater than or equal to 50%, said number average molecular weight of the higher molecular weight polyol being no greater than approximately 4,000. Phrased alternatively, yet not identically, a first of said at least two polyols having a number average molecular weight ranging from approximately 400 to 2000, and a second of said at least two polyols having a number average molecular weight ranging from approximately 800 to 4000 wherein a molecular weight of said second polyol is always greater than a molecular weight of said first polyol, more preferably the number average molecular weight of said first polyol ranges from approximately 600 to 1500, and the number average molecular weight of said second polyol ranges from approximately 1200 to 3000, most preferably the number average molecular weight of said first polyol ranges from approximately 800 to 1200, and the number average molecular weight of said second polyol ranges from approximately 1600 to 2400.

It is specifically understood that the low pressure build foams can be made using higher functionality polyols, e.g., triols, tetrols, provided that the equivalent weight (i.e., molecular weight divided by functionality) of such polyols is approximately in the same ratio as listed above. For example, a triol (1–50%) of similar equivalent weight (i.e., 3000/3) could be used in substitution for the 1,000 molecular weight diol. It is also envisioned to be within this invention to include polymeric methylenediisocyanates with functionalities of between 2 to 2.7 inclusive.

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A one-component polyurethane foam comprising:
   (a) at least two polyols, a first of said at least two polyols having a number average molecular weight ranging from approximately 400 to 2000, and a second of said at least two polyols having a number average molecular weight ranging from approximately 800 to 4000 wherein said first and second polyols are polyalkylene polyols; and
   (b) at least one diisocyanate;
   (c) at least one non-ozone depleting blowing agent; and
   (d) an amount of pressure build due to post expansion is less than or equal to approximately 2 psig and wherein said foam experiences substantially no contraction over time.

2. The foam of claim 1 wherein
the number average molecular weight of said first polyol ranges from approximately 600 to 1500, and
the number average molecular weight of said second polyol ranges from approximately 1200 to 3000.

3. The foam of claim 2 wherein
the number average molecular weight of said first polyol ranges from approximately 800 to 1200, and
the number average molecular weight of said second polyol ranges from approximately 1600 to 2400.

4. The foam of claim 1 wherein
the at least one non-ozone depleting blowing agent is a hydrofluorocarbon.

5. The foam of claim 4 wherein
the at least one non-ozone depleting blowing agent further comprises a hydrofluorocarbon and a hydrocarbon.

6. The foam of claim 1 wherein
at least one non-ozone depleting blowing agent comprises a major amount of a non-ozone depleting blowing agent and a minor amount of an ozone depleting blowing agent.

7. The foam of claim 1 wherein
at least one of said at least two polyols is selected from the group consisting of polyesters and polyether polyols.

8. The foam of claim 1 which further comprises
a cell opening additive selected from the group consisting of an alkanoic acid, an alkylene oxide and a liquid polybutadiene.

9. The foam of claim 7 wherein
at least one of said at least two polyols is a polyalkylene polyol.

10. The foam of claim 9 wherein
at least two of said at least two polyols is a polyalkylene polyol.

11. The foam of claim 1 wherein
at least one of said at least one diisocyanate is selected from the group consisting of 4,4'-diphenylmethane diisocyanate and oligomers of 4,4'-diphenylmethane diisocyanate.

12. The foam of claim 11 wherein
at least one of said at least one diisocyanate is 4,4'-diphenylmethane diisocyanate.

13. The foam of claim 11 which comprises
two diisocyanates selected independently from the group consisting of 4,4'-diphenylmethane diisocyanate and oligomers of 4,4'-diphenylmethane diisocyanate.

14. The foam of claim 1 wherein
said foam is a rigid foam.

15. The foam of claim 14 wherein
said at least one non-ozone depleting agent is a hydrofluorocarbon gas.

16. The foam of claim 15 wherein
said hydrofluorocarbon gas is 1,1,1,2-tetrafluoroethane.

17. A polyurethane one-component foam comprising:
   (a) at least two polyols, a difference in number average molecular weight between said at least two polyols being greater than or equal to 10%, and wherein said number average molecular weight of the higher molecular weight polyol being no greater than approximately 4,000; and
   (b) at least one diisocyanate;
   (c) at least one non-ozone depleting blowing agent; and wherein
   (d) an amount of pressure build due to post expansion is less than approximately 2 psig and wherein said foam experiences substantially no contraction over time.

18. The foam of claim 17 wherein
a difference in number average molecular weight between said at least two polyols is greater than or equal to 20%.

19. The foam of claim 18 wherein
a difference in number average molecular weight between said at least two polyols is greater than or equal to 35%.

20. The foam of claim 19 wherein
a difference in number average molecular weight between said at least two polyols is greater than or equal to 50%.

21. The foam of claim 17 wherein
the at least one non-ozone depleting blowing agent is a hydrofluorocarbon.

22. The foam of claim 21 wherein
the at least one non-ozone depleting blowing agent further comprises a hydrofluorocarbon and a hydrocarbon.

23. The foam of claim 17 wherein
the at least one non-ozone depleting blowing agent comprises a major amount of a non-ozone depleting blowing agent and a minor amount of an ozone depleting blowing agent.

24. The foam of claim 17 wherein
at least one of said at least two polyols is selected from the group consisting of polyesters and polyether polyols.

25. The foam of claim 17 which further comprises
a cell opening additive selected from the group consisting of an alkanoic acid, an alkylene oxide and a liquid polybutadiene.

26. The foam of claim 24 wherein
at least one of said at least two polyols is a polyalkylene polyol.

27. The foam of claim 26 wherein
at least two of said at least two polyols is a polyalkylene polyol.

28. The foam of claim 27 wherein
at least one of said at least one diisocyanate is selected from the group consisting of 4,4'-diphenylmethane diisocyanate and oligomers of 4,4'-diphenylmethane diisocyanate.

29. The foam of claim 28 wherein
at least one of said at least one diisocyanate is 4,4'-diphenylmethane diisocyanate.

30. The foam of claim 28 which comprises
two diisocyanates selected independently from the group consisting of 4,4'-diphenylmethane diisocyanate and oligomers of 4,4'-diphenylmethane diisocyanate.

31. The foam of claim 17 wherein
said foam is a rigid foam.

32. The foam of claim 31 wherein
said at least one non-ozone depleting agent is a hydrofluorocarbon gas.

33. The foam of claim 32 wherein
said hydrofluorocarbon gas is 1,1,1,2-tetrafluoroethane.

34. A one-component polyurethane foam comprising:
(a) at least two polyols, a first of said at least two polyols having a number average molecular weight ranging from approximately 800 to 1200, and a second of said at least two polyols having a number average molecular weight ranging from approximately 1600 to 2400 wherein said first and second polyols are polyalkylene polyols; and
(b) at least one diisocyanate wherein at least one diisocyanate is 4,4'-diphenylmethane diisocyanate;
(c) at least one non-ozone depleting blowing agent wherein a major amount of said blowing agent is 1,1,1,2-tetrafluoroethane; and
(d) at least one liquid polybutadiene cell opening agent.

35. The foam of claim 34 wherein
an amount of pressure build due to post expansion is less than or equal to approximately 2 psig and wherein said foam experiences substantially no contraction over time.

36. The foam of claim 34 wherein
the at least one non-ozone depleting blowing agent is a hydrofluorocarbon.

37. The foam of claim 36 wherein
the at least one non-ozone depleting blowing agent further comprises a hydrofluorocarbon and a hydrocarbon.

38. The foam of claim 34 wherein
the at least one non-ozone depleting blowing agent comprises a major amount of a non-ozone depleting blowing agent and a minor amount of an ozone depleting blowing agent.

39. The foam of claim 34 wherein
at least one of said at least two polyols is selected from the group consisting of polyesters and polyether polyols.

40. The foam of claim 34 which further comprises
a cell opening additive selected from the group consisting of an alkanoic acid, an alkylene oxide and a liquid polybutadiene.

41. The foam of claim 34 wherein
at least one of said at least two polyols is a polyalkylene polyol.

42. The foam of claim 41 wherein
at least two of said at least two polyols is a polyalkylene polyol.

43. The foam of claim 34 wherein
at least one of said at least one diisocyanate is selected from the group consisting of 4,41-diphenylmethane diisocyanate and oligomers of 4,4'-diphenylmethane diisocyanate.

44. The foam of claim 43 wherein
at least one of said at least one diisocyanate is 4,4'-diphenylmethane diisocyanate.

45. The foam of claim 43 which comprises
two diisocyanates selected independently from the group consisting of 4,4'-diphenylmethane diisocyanate and oligomers of 4,4'-diphenylmethane diisocyanate.

46. The foam of claim 35 wherein
said foam is a rigid foam.

47. The foam of claim 46 wherein
said at least one non-ozone depleting agent is a hydrofluorocarbon gas.

48. The foam of claim 47 wherein
said hydrofluorocarbon gas is 1,1,1,2-tetrafluoroethane.

49. A one-component polyurethane foam comprising:
(a) at least two polyols, a first of said at least two polyols having a number average molecular weight ranging from approximately 400 to 2000, and a second of said at least two polyols having a number average molecular weight ranging from approximately 800 to 4000 wherein said first and second polyols are polyalkylene polyols;
(b) at least one diisocyanate;
(c) at least one non-ozone depleting blowing agent;
(d) at least one liquid polybutadiene cell opening agent; and
(e) an amount of pressure build due to post expansion is less than approximately 2 psig and wherein said foam experiences substantially no contraction over time.

50. The foam of claim 49 wherein
the number average molecular weight of said first polyol ranges from approximately 600 to 1500, and
the number average molecular weight of said second polyol ranges from approximately 1200 to 3000.

51. The foam of claim 50 wherein
the number average molecular weight of said first polyol ranges from approximately 800 to 1200, and
the number average molecular weight of said second polyol ranges from approximately 1600 to 2400.

52. The foam of claim 49 wherein
the at least one non-ozone depleting blowing agent is a hydrofluorocarbon.

53. The foam of claim 52 wherein
the at least one non-ozone depleting blowing agent further comprises a hydrofluorocarbon and a hydrocarbon.

54. The foam of claim 49 wherein
(a) wherein at least one diisocyanate is selected from the group consisting of 4,4'-diphenylmethane diisocyanate and oligomers of 4,4'-diphenylmethane diisocyanate; and
(b) wherein a major amount of said blowing agent is 1,1,1,2-tetrafluoroethane.

55. The foam of claim 49 wherein
said cell opening additive further comprises an alkanoic acid or an alkylene oxide.

56. The foam of claim 49 wherein
said foam is a rigid foam.

* * * * *

UNITED STATES PATENT AND TRADEMARK OFFICE
CERTIFICATE OF CORRECTION

PATENT NO. : 6,410,609 B1
DATED : June 25, 2002
INVENTOR(S) : Anthony James Taylor and Reto Faessler It is certified that error appears in the above-identified patent and that said Letters Patent is hereby corrected as shown below:

Column 4,
Line 6, delete "(RFC" and substituting therefor -- (HFC) --.

Column 5,
Line 19, delete "2-4-toluenedianiine" and substituting therefor -- 2,4-toluenediamine --.

Column 6,
Line 2, delete "2-methylpentamnethylene" and substituting therefor
-- 2-methylpentamethylene --;
Line 38, delete "(HLFC" and substituting therefor -- (HFC --;

Column 7,
Line 48, delete "ethyihexanoic" and substituting therefor -- ethylhexanoic --;
Line 55, delete "fiunaric" and substituting therefor -- fumaric --.

Column 8,
Line 57, delete "–SR$^2$CO" and substituting therefor -- –SR2COO– --.

Column 9,
Line 19, delete "tetramethyldiarinoethyl" and substituting therefor
-- tetramethyldiaminoethyl --;
Line 60, "tris-o-chloropropyl" and substituting therefor -- tris-β-chloropropyl --.

Column 10,
Line 35, delete "mnPa.s" and substituting therefor -- mPa.s --;
Line 58, before "-methylstyrene" the symbol -- α --.

Column 17,
Lines 36 and 37, delete "(We)" and substituting therefor -- (Wc --.

Column 19,
Line 42, insert the word -- the -- before "at least one non-ozone …".

UNITED STATES PATENT AND TRADEMARK OFFICE
CERTIFICATE OF CORRECTION

PATENT NO. : 6,410,609 B1
DATED : June 25, 2002
INVENTOR(S) : Anthony James Taylor and Reto Faessler It is certified that error appears in the above-identified patent and that said Letters Patent is hereby corrected as shown below:

Column 21,
Line 60, delete "4,41-diphenylmethane" and substituting therefor
-- 4,4'-dipphenylmethane --.

Signed and Sealed this

Third Day of December, 2002

JAMES E. ROGAN
*Director of the United States Patent and Trademark Office*